United States Patent
Schwartz

[11] 4,091,030
[45] May 23, 1978

[54] PROTECTED GRAFT COPOLYMERS OF CYCLIC NITROGENOUS AND ESTER MONOMERS

[75] Inventor: Nelson N. Schwartz, Teaneck, N.J.

[73] Assignee: Air Products and Chemicals, Inc., Allentown, Pa.

[21] Appl. No.: 691,274

[22] Filed: Jun. 1, 1976

Related U.S. Application Data

[63] Continuation-in-part of Ser. No. 438,222, Jan. 31, 1974, abandoned.

[51] Int. Cl.$^2$ .................. C07D 207/26; C07D 223/10; C07D 211/78
[52] U.S. Cl. .................. 260/326.25; 260/239.3 R; 260/293.63; 260/326.5 FL; 260/326.42
[58] Field of Search ............. 260/326.25, 239.3 R, 260/293.63, 326.5 FL

[56] References Cited

U.S. PATENT DOCUMENTS 3,746,663 7/1973 Beale et al. .................. 260/326.5

Primary Examiner—R. J. Gallagher
Assistant Examiner—Mark L. Berch
Attorney, Agent, or Firm—Richard A. Dannells, Jr.; Barry Moyerman

[57] ABSTRACT

The protected copolymer compositions of the present invention have the following structural formula:

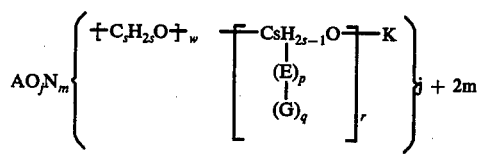

wherein
A is a cyclic or acyclic group having 1 to 12 carbon atoms, 2 to 26 − ($j + m$) hydrogen atoms, 0 to 4 oxygen atoms, and 0 to 2 nitrogen atoms,
E is a group having the structure

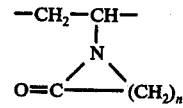

wherein $n$ is 3 to 5,
G is a group having the structure

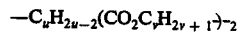

$-C_uH_{2u-2}(CO_2C_vH_{2v+1})_2$ wherein $u$ is 2 or 3 and $v$ is an integer from 2 to 9,
K is a radical selected from the group consisting of

R—, RCO—, RNHCO—, ROC(CH$_3$)H—, and 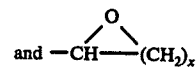

wherein R is a cyclic or acyclic radical having 1 to 18 carbon atoms and $x$ is 3 or 4,
$j$ is an integer from 0 to 8,
$m$ is an integer from 0 to 4,
$j + m$ is 1 to 8,
$s$ is an integer from 2 to 4,
$w$ is 1 to 200,
$p$ is 1 to 10,
$q$ is 1 to 10, and
$r$ is 1 to 50.

The compositions of this invention have been found to be useful as stabilizers in the preparation of cellular foams.

3 Claims, No Drawings

PROTECTED GRAFT COPOLYMERS OF CYCLIC NITROGENOUS AND ESTER MONOMERS

CROSS REFERENCE TO RELATED APPLICATIONS

This application is a continuation-in-part of application Ser. No. 438,222, filed Jan. 31, 1974, now abandoned.

BACKGROUND OF THE INVENTION

1. Field of the Invention

This invention is directed to a novel class of compounds. More particularly, the invention relates to copolymers of certain cyclic nitrogenous and dibasic acid ester monomers.

2. Prior Art

Beale et al, U.S. Pat. No. 3,746,663, discloses a polymerization product of N-vinyl pyrrolidone and dibutyl maleate polymerized in the presence of a polyfunctional polyether polyol. The resulting materials contain a plurality of hydroxyl groups, e.g. the product of Example 1 of this product has a hydroxyl number of about 33. Such polyhydroxylic materials are excellent cellular foam stabilizers, but because the product contains free hydroxyl groups, they react with and destroy isocyanato groups, increase the viscosity of the isocyanate component and therefore, cause an undesirable modification of the activity of the finished stabilizer on storage in isocyanate-premix systems.

SUMMARY OF THE INVENTION

In contrast to the prior art compositions, the compositions of the present invention are substantially free of hydroxyl groups so that the resulting compositions can be mixed with the isocyanate without resulting in a chemical reaction which consumes isocyanate and increases the viscosity of the resulting mixture, thus allowing storage for prolonged periods of time.

In accordance with the present invention, a composition is provided having the following formula:

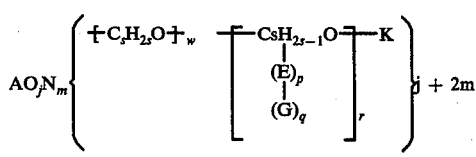

wherein

A is a cyclic or acyclic group having 1 to 12 carbon atoms, 2 to [26 − (j + m)] hydrogen atoms, 0 to 4 oxygen atoms, and 0 to 2 nitrogen atoms, E is a group having the structure

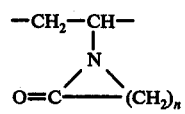

wherein $n$ is 3 to 5, G is a group having the structure

wherein $u$ is 2 or 3 and $v$ is an integer from 2 to 9, K is a radical selected from the group consisting of

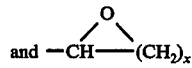

wherein R is a cyclic or acyclic radical having 1 to 18 carbon atoms and $x$ is 3 or 4, $j$ is an integer from 0 to 8,
$m$ is an integer from 0 to 4,
$j + m$ is 1 to 8,
$s$ is an integer from 2 to 4,
$w$ is 1 to 200,
$p$ is 1 to 10,
$q$ is 1 to 10, and
$r$ is 1 to 50.

The sequences of $(E)_p$ and $(G)_q$ in

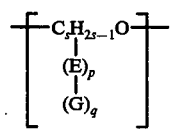

and the sequences of $+C_sH_{2s}O+$ and

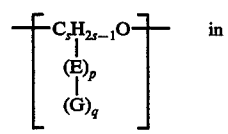 in

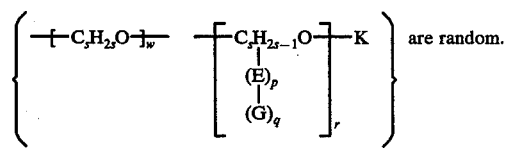 are random.

If $(G)_q$ is in the position as shown above, G contains an unpaired electron which is most likely paired with hydrogen.

The compositions of this invention have been synthesized by copolymerizing a cyclic nitrogenous monomer having the structural formula:

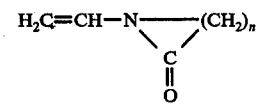

wherein
$n = 3$, 4 or 5.
with an esterified unsaturated dibasic acid having the formula:

wherein $u$ is 2 or 3, and
$v$ is an integer from 2 to 9, while carrying out the copolymerization in the presence of a free radical initiator and a polyfunctional polyether polyol, which is treated with a suitable protecting or capping agent to convert the hydroxyl groups of the polyether polyol to groups substantially inert to isocyanate. This protective treatment may take place either before or after the copolymerization.

PREFERRED EMBODIMENTS OF THE PRESENT INVENTION

Typical examples of suitable protective agents in the treatment of the polyfunctional polyether polyols include acetic anhydride, acetyl chloride, ketene, benzoyl chloride, benzoic acid, methyl isocyanate, ethyl isocyanate, phenyl isocyanate, and esters of butyric, caproic, capric, lauric, myristic, palmitic, stearic and oleic acids, or the free acids, and vinyl ethers such as methyl vinyl ether, n-butyl vinyl ether, isobutyl vinyl ether, and 2,3-dihydrofuran.

The cyclic nitrogenous monomers that can be employed in the compositions of the present invention are N-vinyl-2-pyrrolidone, N-vinyl-2-caprolactam and N-vinyl-2-piperidone.

The esterified unsaturated dibasic acids that may be used in the compositions of this invention, as indicated in the above formula, have 10 to 17 carbon atoms per molecule. Typical examples of such esters include dibutyl fumarate, dinonyl fumarate, dibutyl maleate, dioctyl methylenemalonate, diethyl itaconate and dibutyl itaconate.

The polyfunctional polyether polyol that is used in the compositions of the present invention is the reaction product of the alkylene oxide treatment of water or a polyhydric alcohol having 2 to 8 hydroxyl groups, such as glycerine, propylene glycol, sorbitol, sucrose, aminosucrose, alpha-methyl glucoside, ethylene glycol, pentaerythritol, trimethylolpropane, and the like or a di- or polyamine such as ethylene diamine and butylene diamine. Such a polyolalkylene oxide adduct is further characterized in that the weight average molecular weight is in the range of about 500 to about 5000. A preferred range with triols is a weight average molecular weight from about 1500 to about 4000.

The alkylene oxide used in the preparation of the polyether polyols may be ethylene, propylene, or butylene oxide or mixtures thereof. Propylene oxide is preferred and approximately equal results are obtained when the treatment is first with propylene oxide and then with ethylene oxide.

The free radical initiator used in the copolymerization reaction to produce compositions of this invention may be any of the known free radical initiators, including for example, the peroxide type such as benzoyl peroxide, or the azo type such as azo-bis-isobutyronitrile; with the provision that such free radical initiators are effective at the polymerization conditions, preferably being effective at temperatures in the range of from about 30° to about 140° C.

The structural formula for the preferred compositions of the present invention is

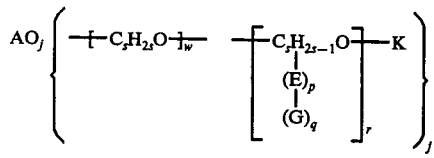

wherein
A is a hydrocarbon radical having 1 to 12 carbon atoms and 2 to 26-$j$ hydrogen atoms,
E is a group having the structure

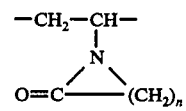

wherein $n$ is 3 to 5,
G is a group having the structure

wherein $u$ is 2 or 3 and $v$ is an integer from 2 to 9, K is a radical selected from the group consisting of R—, RCO—, RNHCO—, ROC(CH$_3$)H—, and

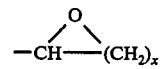

wherein R is an alkyl group having 1-18 carbon atoms or phenyl and $x$ is 3 or 4,
$j$ is an integer of 1 to 8,
$s$ is an integer from 2 to 4,
$w$ is 1 to 200,
$p$ is 1 to 10,
$q$ is 1 to 10, and
$r$ is 1 to 50.

In the structural formula for the most preferred compositions of the present invention:
A is a hydrocarbon radical having 2 to 6 carbon atoms and 4 to 12 hydrogen atoms,
$v$ is an integer of 3 to 6,
$j$ is an integer of 2 to 6,
$s$ is an integer of 2 or 3,
$w$ is 1 to 50,
$p$ is 1 to 5,
$q$ is 1 to 5, and
$r$ is 1 to 8.

It is apparent from a study of the foregoing structural formula that since $j$ is an integer of 2 to 6, $r$ has 2 to 6 values, respectively and the sum of the values of $r$ in the formula ranges from 1 to 8.

The compositions of the present invention have been found to be useful for the preparation of cellular foam stabilizers effective in the stabilization of foam products prepared from isocyanate-containing formulations. A full disclosure of the use of the present compositions is found in the copending application Ser. No. 438,241, filed Jan. 31, 1974, now U.S. Pat. No. 3,914,188 entitled "Method of Preparing Cellular Foam Using Polymeric Stabilizers of Cyclic Nitrogenous Monomers", which disclosure is incorporated by reference into this application and made a part thereof.

Selected compositions of this invention have been subjected to column chromatography by placing a portion of the composition in a suitable solvent and passing the resulting solution through a column containing either basic or neutral alumina. The resulting infrared spectrum of each fraction passing through the column has indicated the presence of groups derived from the nitrogenous monomer, the dibasic ester and the polyether polyol from which the compound had been derived. The present compositions have been found to be substantially free of uncapped polyols and of ungrafted copolymers of nitrogenous monomers and the esterified unsaturated dibasic acids or the homopolymers of either the nitrogenous monomer or the dibasic ester. Gel permeation chromatography also indicated the presence of a single peak for the compositions of this invention. No peaks corresponding to capped polyols, homopolymers of nitrogenous monomers, homopolymers of dibasic ester monomers or copolymers thereof have been observed during the chromatographic analyses of the present compositions.

The following Examples illustrate the synthesis of the compositions of the present invention.

EXAMPLE 1

A solution of 2.25 g. of azo-bis-isobutyronitrile and 0.75 g. of t-butylperbenzoate dissolved in 120 g. (0.526 moles) of dibutyl maleate was added over a two hour period to 560 g. (0.215 moles) of Polyglycol 15-200 (a 2600 molecular weight triol which is prepared by the oxypropylation and oxyethylation of glycerol and which can be purchased in commercial quantities from Dow Chemical Co.). Simultaneously, 66 g. (0.595 moles) of N-vinyl-2-pyrrolidone were also added to the reaction mixture. At this stage, the molar ratio of the reactants was 1 mole of polyol 15-200 to 2.4 moles of dibutyl maleate to 2.8 moles of N-vinyl-2-pyrrolidone. The reaction was conducted in a nitrogen atmosphere with agitation while maintaining a temperature of the reaction mixture at 90° - 95° C. After the two hour addition period, the temperature was then raised to 110° C. After stirring an additional hour, 70 g. of acetic anhydride were added to react with substantially all of the hydroxyl groups of the polyol in the reaction mixture. An exothermic reaction occurred during this capping operation. The mixture was stirred for an additional three hours at 140° C and then the pressure was reduced to 25 mm to remove volatile materials. After all of the volatile materials had been removed, the polymeric product was cooled and bottled. The hydroxyl and acid numbers of the product were both below 3 and the calculated degree of end — capping was greater than 93%. The molecular weight, as determined by gel permeation chromatography, was approximately 3600.

The reaction product of Example 1 based on the above analysis is believed to have the structural formula set forth on page 9, lines 12-15 wherein "A" is a hydrocarbon radical having 3 carbon atoms and 5 hydrogen atoms, i.e.

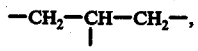

"E" is a group having the structure

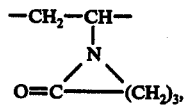

"G" is a group having the structure

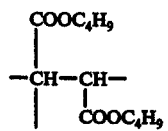

wherein the unpaired electron is most likely paired with H,

"K" is a radical having the structure RCO— wherein R is $CH_3$—,

"$j$" is 3,

"$s$" is either 2 or 3 since the triol used in Example 1 was obtained by the oxypropylation and oxyethylation of glycerol, "$w$" is essentially 15, but ranged from 10 to 20, "$p$" is essentially 1, "$q$" is essentially 1, and "$r$" is essentially 1. In the reaction product of Example 1, $j$ is 3 and thus $r$ has 3 values. In a portion of the molecules of this product, some of the three values of $r$ are zero.

EXAMPLE 2

The same procedure as followed in Example 1 was followed in this Example with the exception that 55 g. of ethyl isocyanate and 1 g. of dibutyl tin dilaurate were substituted for the acetic anhydride protecting agent and the temperature during the addition of the protecting agent was maintained at 70° C.

The product of Example 2 is believed to have the same structural formula as the Example 1 product except that "K" is a radical having the structure RNHCO— where R is $C_2H_5$-.

EXAMPLE 3

The procedure of Example 1 was again repeated but in place of the Polyglycol 15-200, an oxyethylated polypropylene glycol, Pluronic ® L-72 (a 2650 molecular weight diol which is prepared by the oxyethylation of a polypropylene glycol and which is available in commercial quantities from BASF/Wyandotte Corp.) was used, and in place of the dibutyl maleate, dibutyl fumarate was used. The resulting product was a pale liquid of medium viscosity.

The product of Example 3 is believed to have the same structural formula as the Example 1 product except that "A" is a hydrocarbon radical having 2 or 3 carbon atoms and 4 or 6 hydrogen atoms, respectively, i.e. —$CH_2$—$CH_2$— or

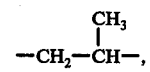

"$j$" is 2 and "$w$" is essentially 25, but ranges from 20 to 30. In some instances of the Example 3 product, "$r$" is 2.

EXAMPLE 4

The procedure of Example 1 was again repeated but in place of the acetic anhydride protecting agent, the solution was treated with 70 g. of isobutyl vinyl ether and 10 g. of solid potassium bisulfate. After stirring the mixture for 4 hours at 95° C, 15 g. of solid sodium carbonate were added. The mixture was then stirred for another hour, cooled and filtered. The hydroxyl number of the resulting product was 8, the acid number was one-half and the calculated degree of end-capping was 83%.

The product of Example 4 is believed to have the same structural formula as the Example 1 product except that "K" is a radical having the structure ROC($CH_3$)H— where R is $C_4H_9$-.

EXAMPLE 5

The procedure of Example 1 was again repeated but in place of the acetic anhydride capping agent, 181 g. of oleic acid were added and the mixture was heated under reduced pressure until no more water was evolved. The pale yellow product had a hydroxyl number of 10, an acid number of 3 and the calculated degree of end-capping was 73%.

The product of Example 5 is believed to have the same structural formula as the Example 1 product except that "K" is a radical having the structure RCO— where R is $C_{17}H_{33}$-.

EXAMPLE 6

560 g. (211 m moles) of Pluronic L-72 and 70 g. (686 m moles) of acetic anhydride were heated for two hours at 95° C and then stripped to a constant weight under reduced pressure. To this material under constant agitation at a temperature of 95° C under a slow stream of nitrogen, 66 g. (600 m moles) of N-vinyl-2-pyrrolidone, and a solution of 2.25 of azo-bis-isobutyronitrile and 0.75 t-butylperoxybenzoate dissolved in 120 g. (526 m moles) of dibutyl maleate was added over a two hour period. At this stage, the molar ratio of the reactants was 1 mole of Pluronic L-72 to 2.5 moles of dibutyl maleate to 2.8 moles of N-vinyl-2-pyrrolidone. After the two hour addition, the mixture was heated for an additional hour at 105° C. The pressure was reduced to remove volatiles and an organic viscous fluid product was recovered.

The product of Example 6 is believed to have the same structural formula as the Example 1 product except that "A", "j", and "w" are the same as set forth in Example 3. In some instances of the Example 6 product, "r" is 2.

EXAMPLE 7

A mixture of 2600 g. (1 mole) Polyglycol 15-200, 300 g. (4.2 moles) of ethyl vinyl ether and 50 g. of solid potassium bisulfate was stirred overnight under nitrogen at 50° C. The resulting solids were then removed by filtration. The filtrate had an acid number of 0.4 and a hydroxy number of 3.2. The calculated degree of end-capping was about 95%. A solution of 51 g. (224 m moles) of dibutyl maleate containing 0.95 g. azo-bis-isobutyronitrile and 0.3 ml. of t-butylperoxybenzoate was added over two hours to 157 g. (56 m moles) of the above polyether acetyl while stirring at 90°-95° C and simultaneously adding 35 g. (252 m moles) of molten N-vinylcaprolactam. The molar ratio of the reactants was 1 mole of Polyglycol, 4 moles of dibutyl maleate and 4.5 moles of N-vinylcaprolactam. When the addition was complete, the solution was stirred one hour at 105° C, and then cooled. The resulting product was a viscous amber liquid.

The product of Example 7 is believed to have the same structural formula as the Example 1 product except that "E" is a group having the structure

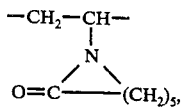

"K" is a radical having the structure $ROC(CH_3)H$— where R is $C_2H_5$ and "r" is the same as set forth in Example 3.

EXAMPLE 8

The procedure of Example 7 was repeated except that the N-vinylcaprolactam was replaced by 28 g. (252 m moles) of N-vinylpyrrolidone and the dibutyl maleate was replaced by 45 g. (225 m moles) of dipropyl maleate.

The product of Example 8 is believed to have the same structural formula as the Example 1 product except that "G" is a group having the structure

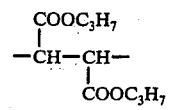

wherein the unpaired electron is most likely paired with H and "K" is the same as set forth in Example 7.

EXAMPLE 9

The procedure of Example 8 was repeated except that the dipropyl maleate was replaced by 64 g. of di-n-hexyl maleate.

The product of Example 9 is believed to have the same structural formula as the Example 1 product except that "G" is a group having the structure

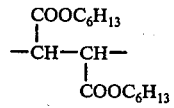

wherein the unpaired electron is most likely paired with H.

The foregoing Examples have illustrated the synthesis of the compositions of the present invention by one of the two methods as follows. In the first method, a mixture of 1 mole of a polyether polyol and about 2 to about 5 moles each of an esterified unsaturated dibasic acid and a cyclic nitrogenous monomer was reacted in the presence of a free radical initiator for a period of time at an elevated temperature. The reaction product was then treated with a capping agent to convert substantially all of the hydroxyl groups of the polyether polyol to groups substantially inert to isocyanates. In the second method, a polyether polyol was treated with a capping agent to convert substantially all of the hydroxyl groups of the polyether polyol to groups substantially inert to isocyanates. A mixture of 1 mole of the capped polyether polyol and about 2 to 5 moles each of an esterified unsaturated dibasic acid and a cyclic nitrogenous monomer was reacted in the presence of the free radical initiator for a period of time at an elevated temperature. In either method, the volatile, unreacted reactants in the reaction product were removed.

I claim:
1. A composition which comprises the reaction product of a free radical-initiated copolymerization of a cyclic nitrogenous monomer having the structural formula:

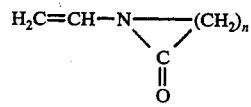

wherein n is 3, 4 or 5, and
an esterified unsaturated dibasic acid having the structural formula:

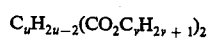

wherein $u$ is 2 or 3, and $v$ is an integer from 2 to 9, said free radical-initiated copolymerization being carried out substantially to completion in the presence of a polyfunctional polyether polyol, which is the reaction product of the alkylene oxide treatment of water or a polyhydric alcohol having 2 to 8 hydroxyl groups and having a weight average molecular weight in the range of about 500 to about 5,000 which has been treated with a capping agent selected from the group consisting of acetic anhydride, acetyl chloride, ketene, benzoyl chloride, benzoic acid, methyl isocyanate, ethyl isocyanate, phenyl isocyanate, and butyric, caproic, capric, lauric, myristic, palmitic, stearic and oleic acids, vinyl methyl ether, vinyl isobutyl ether, N-butyl vinyl ether and 2,3-dihydrofuran to convert substantially all of the hydroxyl groups of said polyether polyol to groups substantially inert to isocyanates.

2. The composition of claim 1 wherein said cyclic nitrogenous monomer is N-vinyl-2-pyrrolidone.

3. The composition of claim 1 wherein said esterified unsaturated dibasic acid is dibutyl maleate.

* * * * *